United States Patent
Hegna

(10) Patent No.: US 10,401,518 B2
(45) Date of Patent: *Sep. 3, 2019

(54) ESTIMATION OF DIRECT ARRIVAL SIGNALS BASED ON PREDICTED DIRECT ARRIVAL SIGNALS AND MEASUREMENTS

(71) Applicant: PGS Geophysical AS, Oslo (NO)

(72) Inventor: Stian Hegna, Oslo (NO)

(73) Assignee: PGS Geophysical AS, Oslo (NO)

( * ) Notice: Subject to any disclaimer, the term of this patent is extended or adjusted under 35 U.S.C. 154(b) by 175 days.

This patent is subject to a terminal disclaimer.

(21) Appl. No.: 15/366,957

(22) Filed: Dec. 1, 2016

(65) Prior Publication Data

US 2017/0082760 A1    Mar. 23, 2017

Related U.S. Application Data

(63) Continuation of application No. 14/538,583, filed on Nov. 11, 2014, now Pat. No. 9,513,392.

(60) Provisional application No. 61/941,394, filed on Feb. 18, 2014.

(51) Int. Cl.
*G01V 1/36* (2006.01)
*G01V 1/38* (2006.01)

(52) U.S. Cl.
CPC .............. *G01V 1/36* (2013.01); *G01V 1/38* (2013.01); *G01V 1/3808* (2013.01); *G01V 2210/57* (2013.01)

(58) Field of Classification Search
CPC .......... G01V 1/38; G01V 1/3808; G01V 1/36; G01V 2210/57
USPC ........................................................ 367/21
See application file for complete search history.

(56) References Cited

U.S. PATENT DOCUMENTS

| | | | |
|---|---|---|---|
| 7,035,737 | B2 | 4/2006 | Ren |
| 7,039,525 | B2 | 5/2006 | Mittet |
| 7,218,572 | B2 | 5/2007 | Parkes |
| 8,600,680 | B2 | 12/2013 | Parkes et al. |
| 8,625,387 | B2 | 1/2014 | Frivik et al. |

(Continued)

OTHER PUBLICATIONS

Santos de Oliveira, "Seismic pulses obtained from the analysis of direct waves: A comparison to simulated pulses obtained with modeled notionals," The Leading Edge, Jan. 2000, pp. 68-71. (Year: 2000).*

(Continued)

*Primary Examiner* — Daniel L Murphy

(57) ABSTRACT

Estimation of direct arrival signals based on predicted direct arrival signals and measurements can include obtaining notional source signatures for notional sources that correspond to source elements in a seismic source. A first predicted direct arrival signal at a first location and a second predicted direct arrival signal at a second location can be determined. The first location corresponds to a seismic receiver and the second location does not correspond to a seismic receiver. A transfer function can be determined based on the first predicted direct arrival signal at the first location and the second predicted direct arrival signal at the second location. An estimated direct arrival signal at the second location can be determined based on the transfer function and a measurement by the seismic receiver corresponding to the first location. The estimated direct arrival signal represents what a measured direct arrival signal would be at the second location.

19 Claims, 7 Drawing Sheets

(56) References Cited

U.S. PATENT DOCUMENTS

| | | | |
|---|---|---|---|
| 9,513,392 B2* | 12/2016 | Hegna | G01V 1/38 |
| 2007/0270140 A1 | 11/2007 | Ren | |
| 2012/0087207 A1* | 4/2012 | Kostov | G01V 1/38 367/20 |
| 2013/0028049 A1 | 1/2013 | Pan | |
| 2013/0201791 A1 | 8/2013 | Parkes et al. | |
| 2013/0322208 A1 | 12/2013 | Sollner et al. | |
| 2013/0325427 A1 | 12/2013 | Hegna et al. | |
| 2014/0016436 A1 | 1/2014 | Sollner et al. | |

OTHER PUBLICATIONS

Mexican Office Action for related Mexican Application No. MX/A/2015/002128, dated Feb. 1, 2017 (2 pgs) (English Translation and Original Copy).

Majdanski et al., "Attenuation of free-surface multiples by up-down deconvolution for marine towed-streamer data," Geophysics, vol. 76, No. 6, Nov.-Dec. 2011, pp. V129-V138.

Ziolkowski et al., "The signature of an air gun array: Computation from near-field measurements including interactions," Geophysics, vol. 47, No. 10, Oct. 1982, pp. 1413-1421.

TechLink, "3D Finite Difference modeling in Nucleus+," vol. 11, No. 6, Jul. 2011, 4 pp.

TechLink, "Multi-Azimuth 3-D Surface-Related Multiple Elimination—Application to Offshore Nile Data," vol. 9, No. 11, Nov. 2009, 4 pp.

Hobbs et al., "Marine source signature measurement using a reference seismic source," Department of Earth Sciences, University of Cambridge, Bullard Laboratories, downloaded on Mar. 3, 2014, 6 pp.

Ziolkowski, "Why don't we measure seismic signatures?" Geophysics, vol. 56, No. 2, Feb. 1991, pp. 190-201.

* cited by examiner

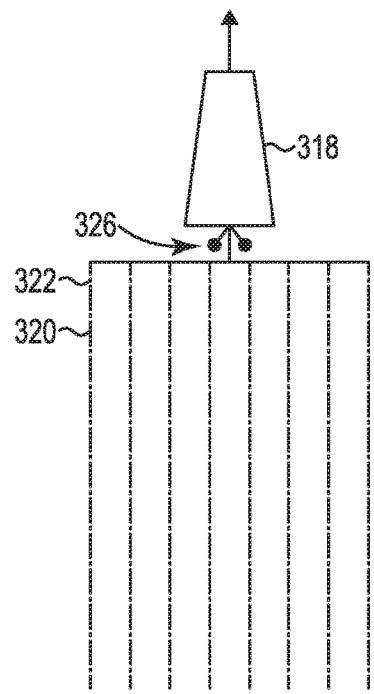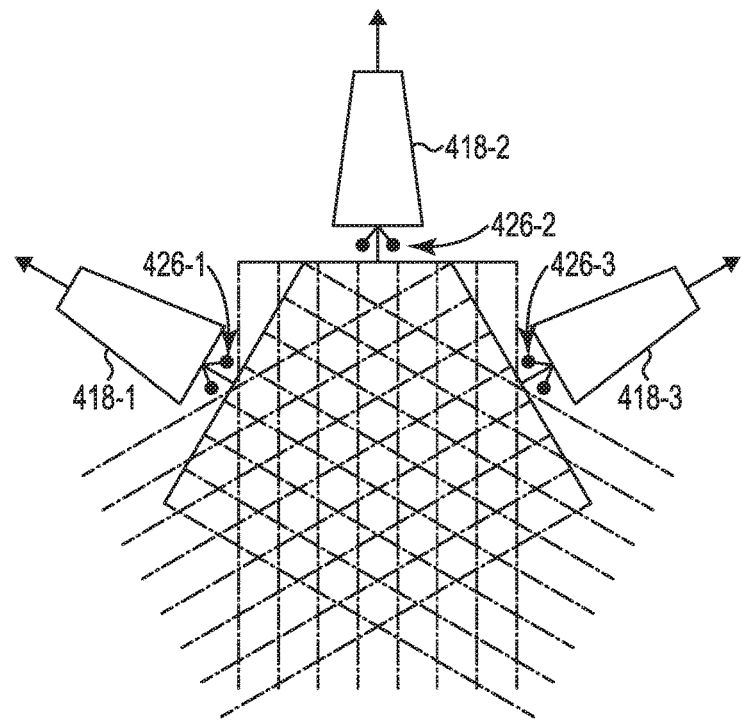
Fig. 3          Fig. 4
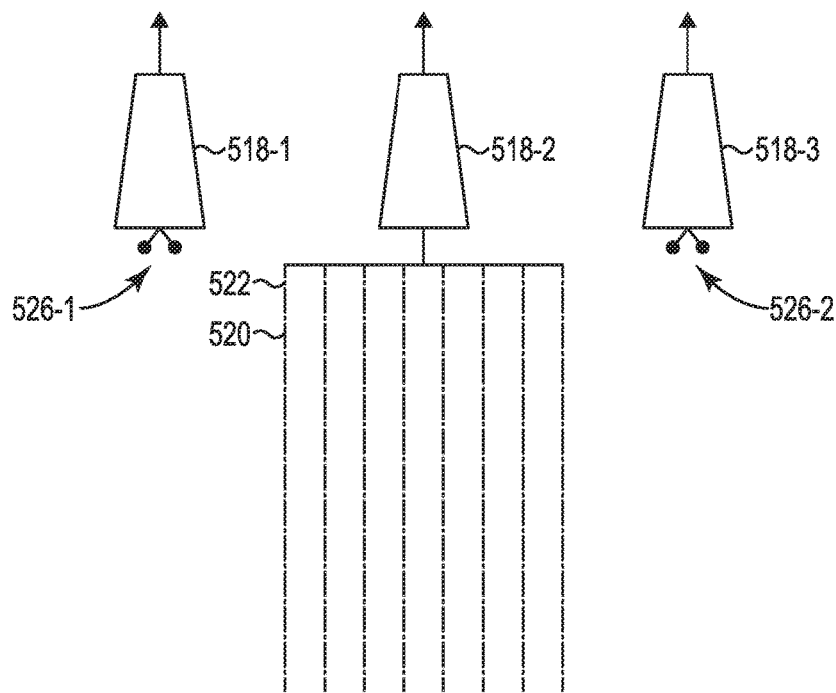
Fig. 5

ESTIMATION OF DIRECT ARRIVAL SIGNALS BASED ON PREDICTED DIRECT ARRIVAL SIGNALS AND MEASUREMENTS

CROSS-REFERENCE TO RELATED APPLICATIONS

This application is a Continuation application of U.S. Non-Provisional application Ser. No. 14/538,583, filed Nov. 11, 2014, published as U.S. Publication No. 2015/0234071 on Aug. 20, 2015, and will issue as U.S. Pat. No. 9,513,392 on Dec. 6, 2016, which claims priority to U.S. Provisional Application 61/941,394, filed Feb. 18, 2014, which is incorporated by reference.

BACKGROUND

In the past few decades, the petroleum industry has invested heavily in the development of marine seismic survey techniques that yield knowledge of subterranean formations beneath a body of water in order to find and extract valuable mineral resources, such as oil. High-resolution seismic images of a subterranean formation are helpful for quantitative seismic interpretation and improved reservoir monitoring. For a typical marine seismic survey, a marine survey vessel tows one or more seismic sources below the surface of the water and over a subterranean formation to be surveyed for mineral deposits. Seismic receivers may be located on or near the seafloor, on one or more streamers towed by the marine survey vessel, or on one or more streamers towed by another vessel. The marine survey vessel typically contains marine seismic survey equipment, such as navigation control, seismic source control, seismic receiver control, and recording equipment. The seismic source control may cause the one or more seismic sources, which can be air guns, marine vibrators, etc., to produce acoustic signals at selected times. Each acoustic signal is essentially a sound wave that travels down through the water and into the subterranean formation. At each interface between different types of rock, a portion of the sound wave may be refracted, a portion of the sound wave may be transmitted, and another portion may be reflected back toward the body of water to propagate toward the surface. The seismic receivers thereby measure a wavefield that was ultimately initiated by the actuation of the seismic source.

BRIEF DESCRIPTION OF THE DRAWINGS

FIG. 3 illustrates a narrow-azimuth geometry survey in association with estimation of direct arrival signals based on predicted direct arrival signals and measurements.

FIG. 4 illustrates a multi-azimuth geometry survey in association with estimation of direct arrival signals based on predicted direct arrival signals and measurements.

FIG. 5 illustrates a wide-azimuth geometry survey in association with estimation of direct arrival signals based on predicted direct arrival signals and measurements.

DETAILED DESCRIPTION

Figure 1:
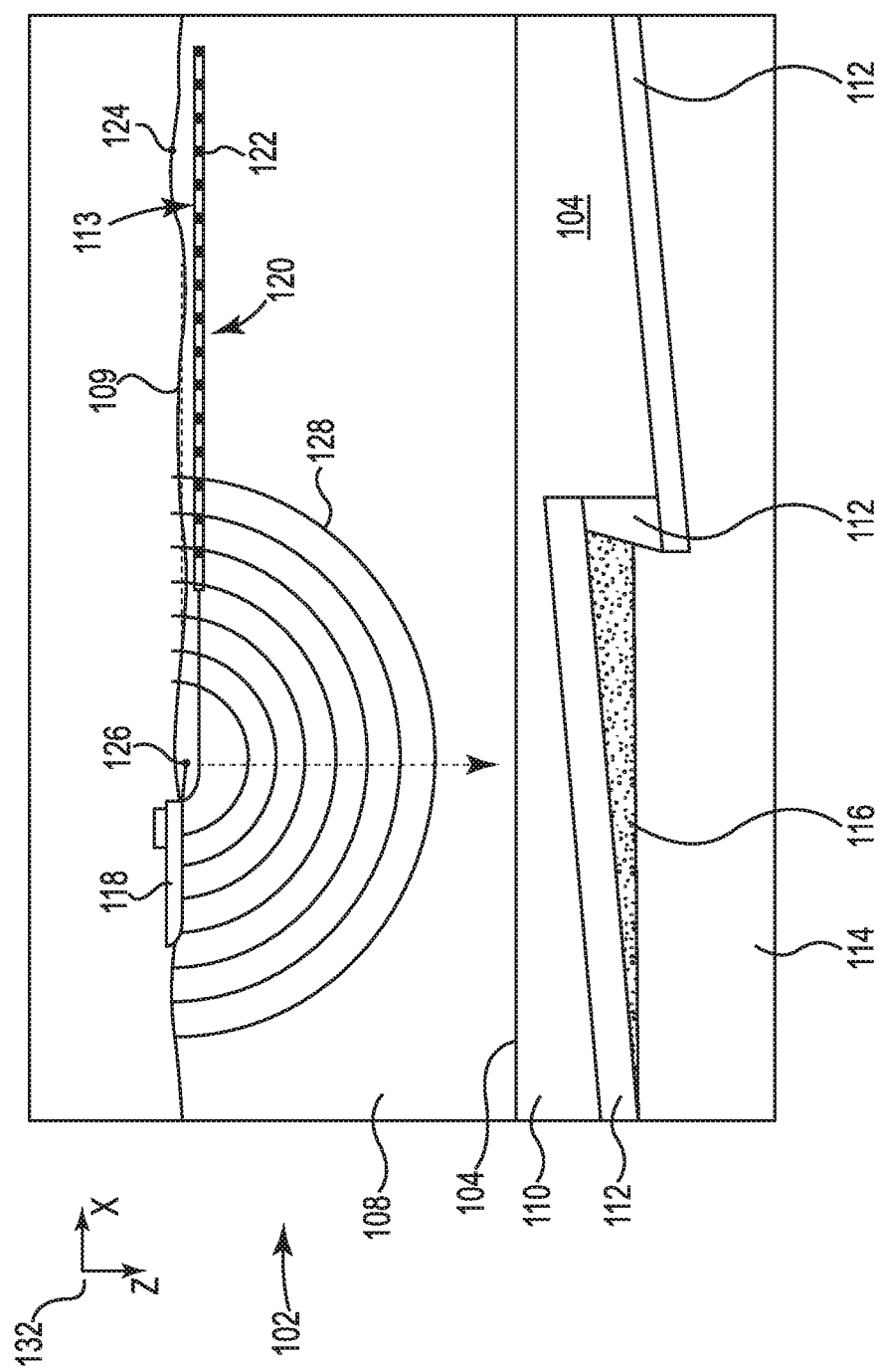
FIG. 1 illustrates an elevation or xz-plane view of marine seismic surveying in which acoustic signals are emitted by a seismic source for recording by seismic receivers for processing and analysis in order to help characterize the structures and distributions of features and materials underlying the solid surface of the earth.

The present disclosure is related to estimation of direct arrival signals based on predicted direct arrival signals and measurements. A seismic source can emit an acoustic signal. As used herein, a source element is a single source device, such as an air gun or marine vibrator. A source unit is a plurality of source elements that are actuated together. A source array is a plurality of source elements or a plurality of source units that may be actuated separately. As used herein, a "seismic source" refers to one or more single source devices, arranged as a source element, source unit, or source array. The acoustic signal emitted by a seismic source can be described as a combination of notional source signatures. Each notional source signature may be an independent source point (notional source) signature. In some embodiments, the combination of notional source signatures may be a sum of the notional source signatures for independent notional sources. Each notional source signature may be a one-dimensional signature because a notional source may emit the same acoustic signal in all directions. Each notional source may correspond to a source element in a seismic source. The pressure variation in water as a function of time caused by an acoustic signal from a seismic source is called the "signature." As used herein, a "predicted direct arrival signal" is a representation of what a measured direct arrival signal would be in a location where there is or is not a seismic receiver based on a number of notional source signatures and assumed relative positions of a number of seismic sources and a number of seismic receivers. As used herein, an "estimated direct arrival signal" is a representation of what a measured direct arrival signal would be in a location where there is or is not a seismic receiver based on a number of predicted direct arrival signals and a number of measured signals. As used herein, a "direct arrival signal" is the signal that arrives directly from a seismic source at a location, for example, without reflecting off of a free surface, a solid surface, or a subsurface.

Estimating a direct arrival signal from a seismic source at a location where there may not be a seismic receiver can be beneficial as described in more detail below. According to some embodiments of the present disclosure, for a notional source signature of a seismic source, a first predicted direct arrival signal at a first location and a second predicted direct arrival signal at a second location can be determined. The first location can correspond to a seismic receiver and the second location may not correspond to a seismic receiver. A transfer function can be determined based on the first predicted direct arrival signal at the first location and the second predicted direct arrival signal at the second location. An estimated direct arrival signal at the second location can be determined based on the transfer function and a measurement by the seismic receiver corresponding to the first location.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 118 may reference element "18" in FIG. 1, and a similar element may be referenced as 218 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates an elevation or xz-plane 132 view of marine seismic surveying in which acoustic signals are emitted by a seismic source for recording by seismic receivers for processing and analysis in order to help characterize the structures and distributions of features and materials underlying the solid surface of the earth. FIG. 1 shows a domain volume 102 of the earth's surface comprising a solid volume 104 of sediment and rock below the solid surface 106 of the earth that, in turn, underlies a fluid volume 108 of water having a free surface 109 such as in an ocean, an inlet or bay, or a large freshwater lake. The domain volume 102 shown in FIG. 1 represents an example experimental domain for a class of marine seismic surveys. FIG. 1 illustrates a first sediment layer 210, an uplifted rock layer 112, second, underlying rock layer 114, and hydrocarbon-saturated layer 116.

FIG. 1 shows an example of a marine survey vessel 118 equipped to carry out marine seismic surveys. In particular, the marine survey vessel 118 can tow one or more streamers 120 (shown as one streamer for ease of illustration) generally located below the free surface 109. The streamers 120 can be long cables containing power and data-transmission lines to which seismic receivers may be connected. In one type of marine seismic survey, each seismic receiver, such as the seismic receiver represented by the shaded disk 122 in FIG. 1, comprises a pair of seismic receivers including a geophone that detects particle displacement within the water by detecting particle motion, velocities or accelerations, and a hydrophone that detects variations in pressure. The streamers 120 and the marine survey vessel 118 can include sophisticated sensing electronics and data-processing facilities that allow seismic receiver readings to be correlated with absolute positions on the free surface and absolute three-dimensional positions with respect to a three-dimensional coordinate system. In FIG. 1, the seismic receivers along the streamers are shown to lie below the free surface 109, with the seismic receiver positions correlated with overlying surface positions, such as a surface position 124 correlated with the position of seismic receiver 122. The marine survey vessel 118 can also tow one or more seismic sources 126 that produce acoustic signals as the vessel 118 and towed streamers 120 move across the free surface 109. Seismic sources 126 and/or streamers 120 may also be towed by other vessels, or may be otherwise disposed in fluid volume 108. For example, seismic receivers may be located on ocean bottom cables or nodes fixed at or near the solid surface 106, and seismic sources 126 may also be disposed in a nearly-fixed or fixed configuration.

FIG. 1 shows an expanding, spherical acoustic signal, represented by semicircles of increasing radius centered at the seismic source 126, such as semicircle 128, following an acoustic signal emitted by the seismic source 126. The acoustic signals are, in effect, shown in vertical plane cross section in FIG. 1. The outward and downward expanding acoustic signal may eventually reach the solid surface 106, at which point the outward and downward expanding acoustic signals may partially reflect from the solid surface and may partially refract downward into the solid volume, becoming elastic acoustic signals within the solid volume.

If the direct arrival signal from a seismic source can be estimated to short offsets (i.e., short seismic source-seismic receiver separation distance), including near-zero offsets, there are significant possibilities that may open up in the processing of the seismic data. For instance, primaries and multiples may be imaged simultaneously with Separated Wave-field Imaging. The down-going acoustic signal may be deconvolved from the up-going acoustic signal pre-stack and prior to imaging, removing most surface multiples as well as deconvolving the direct acoustic signal including the seismic source ghost. Thus, estimating a direct arrival signal that represents what a measured direct arrival signal would be at a location that does not correspond to a seismic receiver can beneficially aid in improving the quality and/or accuracy of a geophysical data product that is generated by processing obtained geophysical data.

One major challenge with towed streamer seismic data is that there is typically little or no information recorded at short offsets. This may be due to the fact that in towed streamer seismic, it is typically not practical to tow streamers directly under the seismic sources. This may be a limiting factor in the processing of the seismic data. One possibility for improvement can include describing how the direct arrival signal at short offsets may be predicted from near-field measurements. In other words, estimation of the direct arrival signal in the missing near-zero offset seismic receiver positions can be performed using near-field measurements, rather than being based on extrapolating the recorded acoustic signal.

This disclosure describes how a transfer function, representing extrapolation operators of the direct arrival signal, may be determined based on predicted direct arrival signals. For example, the predicted direct arrival signals can be determined from the near-field measurements and/or notional source signatures. The transfer function may then be applied to the measured data such that the direct arrival signal may be estimated at a location where there is not a seismic receiver, such as at short or near-zero offset from a seismic source.

Figure 2A:
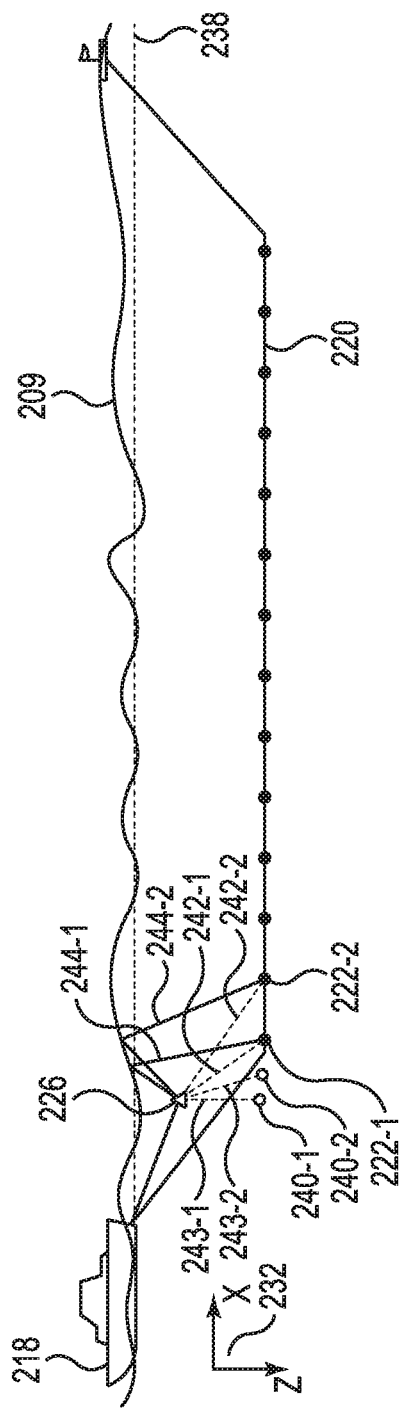
FIGS. 2A-2C illustrate coordinates and terminology associated with a process for estimation of direct arrival signals based on predicted direct arrival signals and measurements.
Figure 2B:
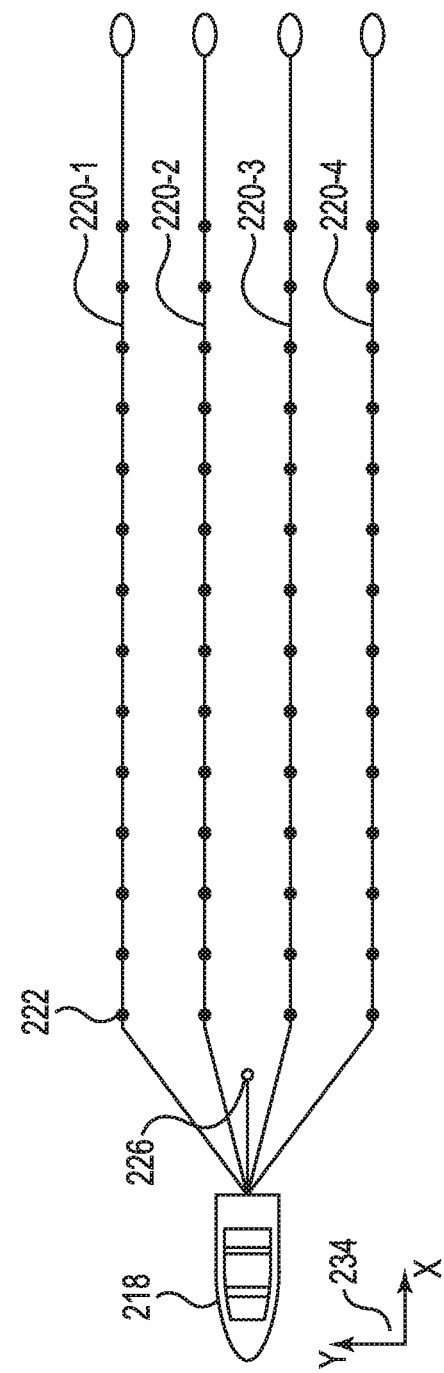
Figure 2C:
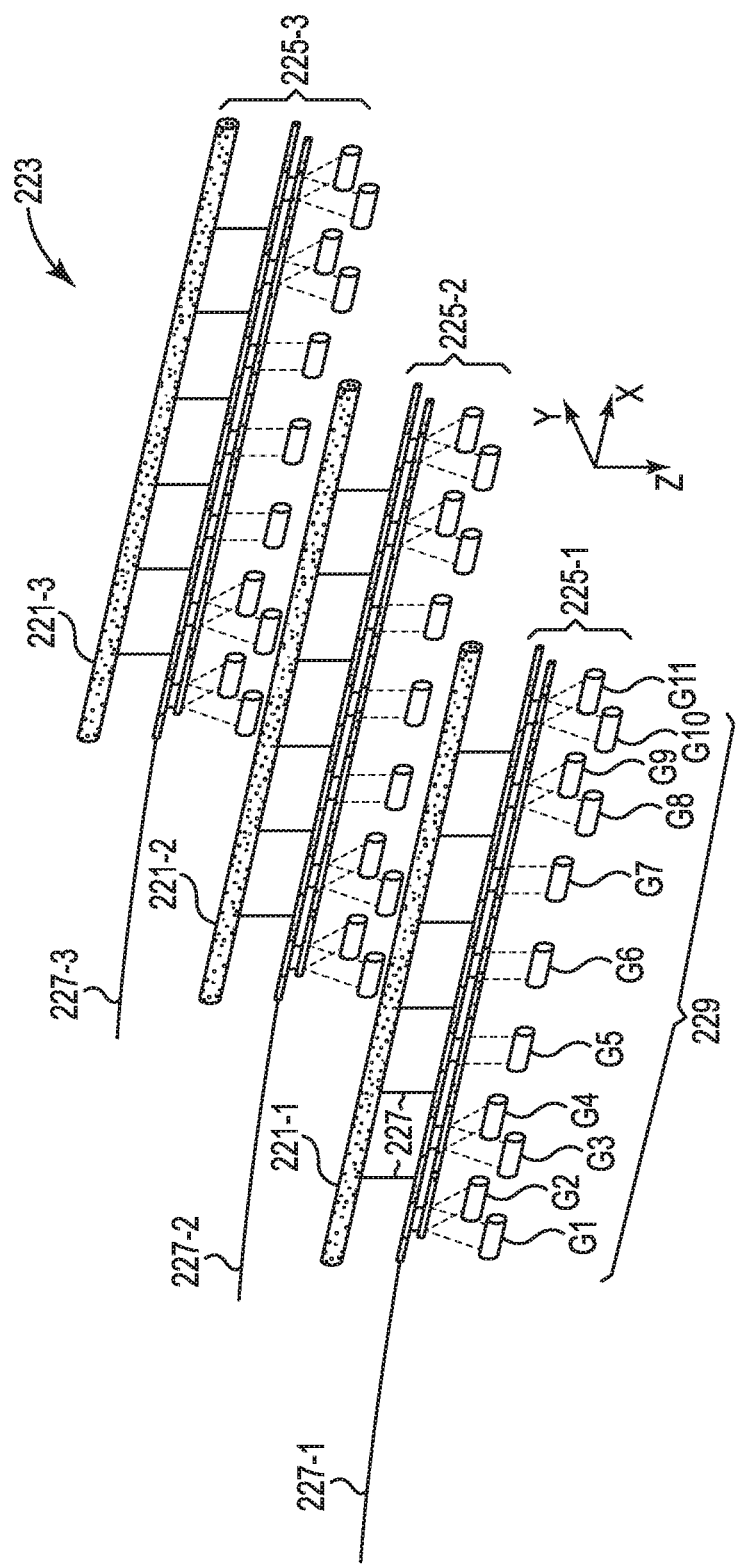

FIGS. 2A-2C illustrate coordinates and terminology associated with a process for estimation of direct arrival signals based on predicted direct arrival signals and measurements. FIG. 2A illustrates an elevation or xz-plane 232 view of a marine survey vessel 218 towing a seismic source 226 and a streamer 220 located beneath a free surface 209. In practice, the seismic source 226 and the streamer 220 may be towed by the same or different vessels. FIG. 2A represents a snapshot, at an instant in time, of the undulating free surface 209 and corresponding smooth wave-like shape in the streamer 220. The streamer 220 may be towed at a desired depth profile, including slanting downward from the marine vessel 218, slanting upward from the marine vessel 218, or with both upward and downward variations along the length of the streamer 220. Likewise, the streamer 220 may be used in conjunction with or replaced by ocean bottom cables or nodes comprising seismic receivers. FIG. 2B includes xy-plane 234 and FIG. 2A includes an xz-plane 232 of the same Cartesian coordinate system used to specify coordinate locations within the fluid volume with respect to three orthogonal, spatial coordinate axes labeled x, y and z. The x coordinate uniquely specifies the position of a point in a direction parallel to the path of travel of the marine survey vessel 218, and the y coordinate uniquely specifies the position of a point in a direction perpendicular to the x axis and substantially parallel to the free surface 209 at marine survey vessel 218, and the z coordinate uniquely specifies the position of a point perpendicular to the xy-plane 234. The geoid 238 is the hypothetical surface of the sea level at marine survey vessel 218 and is used to define zero elevation (i.e., z=0). Shaded disks, such as shaded disks 222-1 and 222-2, represent seismic receivers spaced along streamer 220. Hollow disks 240-1, 240-2 represent locations where there is not a seismic receiver, or where there is not intended to be a seismic receiver. Hollow triangle 226 represents a seismic source.

FIG. 2A includes an illustration of a number of direct arrival signals 242-1, 242-2 from the seismic source 226 at a corresponding number of seismic receivers 222-1, 222-2. Also illustrated at the corresponding number of seismic receivers 222-1, 222-2 is arrival of a corresponding number of reflected arrival signals 244-1, 244-2 from the seismic source 226 reflected off the free surface 209. As described herein, it may be desirable to estimate a direct arrival signal at a location that does not correspond to a seismic receiver, such as locations 240-1, 240-2. An example of such a location where there may not be a seismic receiver (or where it is not intended that there is a seismic receiver) is a location 240-1 essentially directly under the seismic source 226, where placement of a seismic receiver may be impractical. An example of a reason why it may be impractical to place a seismic receiver directly under the seismic source 226 is that such placement could interfere with the down-going acoustic signal from the seismic source 226. However, estimating the down-going acoustic signal directly under the seismic source, in lieu of measuring it directly, can provide valuable information regarding the characteristics of the down-going acoustic signal.

Although locations 240-1, 240-2 are generally described as not corresponding to a seismic receiver, due to the highly variable nature of the position of seismic receivers and seismic sources in marine seismic surveying and the variable nature of the movement of the medium in which the seismic receivers and seismic sources are towed, there may be occasions where locations 240-1, 240-2 do correspond to a seismic receiver. Although FIG. 2A illustrates that a marine survey vessel 218 is towing a streamer 220 with a number of seismic receivers, embodiments are not so limited and can include the use of seismic receivers that are fixed or releasably adhered to a bottom of the fluid volume, such as an ocean bottom cable (OBC) system or a nodal system. An OBC system can include, for instance, seismic receivers spaced along the OBC. Data can be recorded by the seismic receivers along the OBC for later retrieval and processing.

In some examples, both streamers and OBCs can be used to record data to be processed according to the present disclosure.

In accordance with a number of embodiments of the present disclosure, a geophysical data product may be produced. The geophysical data product may include, for example, a direct arrival signal estimated at a location where there is not a seismic receiver to perform a measurement of the direct arrival signal. Geophysical data may be obtained and stored on a non-transitory, tangible computer-readable medium. The geophysical data product may be produced by processing the geophysical data offshore or onshore either within the United States or in another country. If the geophysical data product is produced offshore or in another country, it may be imported onshore to a facility in the United States. In some instances, once onshore in the United States, geophysical analysis may be performed on the geophysical data product. In some instances, geophysical analysis may be performed on the geophysical data product offshore. For example, the estimate of the received signal directly under the seismic source (the down-going acoustic signal) can be deconvolved from data, for example as it is being measured, offshore to facilitate other processing of the measured data either offshore or onshore. As another example, the estimate of the received signal directly under the seismic source (the down-going acoustic signal) can be deconvolved from data, for example the data that has already been measured, offshore or onshore to facilitate other processing of the measured data either offshore or onshore. Embodiments of the present disclosure can be used with shallow (e.g., on the order of tens of meters) and/or deep (e.g., on the order of hundreds of meters) water surveys.

FIG. 2B illustrates a top or xy-plane view of the marine survey vessel 218 towing seismic source 226 and four streamers 220-1, 220-2, 220-3, 220-4 located beneath a free surface. Embodiments are not limited to three seismic sources as embodiments can include more or fewer seismic sources. The seismic source 226 can include one or more source units. For example, some embodiments can include up to 35 or more source units. Furthermore, the configuration of the seismic source can be one-dimensional (e.g., arranged in a line as shown), two-dimensional (e.g., arranged in a rectangular grid), or three-dimensional (e.g., arranged in a cube). In some embodiments, the seismic source can include a number of source elements in a particular configuration that can generate a short-duration impulse, however embodiments are not so limited.

Embodiments are not limited to a particular number of streamers and can include more or fewer than are shown. Some embodiments can include 24 or more streamers. As illustrated, the streamers 220-1, 220-2, 220-3, 220-4 can be modeled as a planar horizontal acquisition surface located beneath the free surface. However, in practice, the acquisition surface can be smoothly varying due to active sea currents and weather conditions. In other words, the towed streamers may also undulate as a result of dynamic conditions of the water. The coordinates of a particular seismic receiver, such as seismic receiver 222, are given by (x, y, z) taking into account both the xz-plane 232 and the xy-plane 234. In some embodiments, the seismic receiver array may vary in the z direction. For example, the seismic receivers disposed farther from the marine survey vessel 218 may be deeper than those closer to the vessel. Likewise, in some embodiments, one or more of the streamers may be towed at a different depth than other streamers, thereby creating an acquisition volume.

FIG. 2C illustrates an isometric view of one possible configuration of seismic source 226 illustrated in FIG. 2A, that being a source array 223. The source array 223 can include a number of source units 225-1, 225-2, 225-3 that each include a number of source elements. For example, source unit 225-1 includes source elements $G_1$-$G_{11}$ generally indicated by reference numeral 229. Using multiple source elements can overcome undesirable aspects of a signature associated with using a single source element. In some embodiments, each source unit can be suspended from a respective float 221-1, 221-2, 221-3.

By way of example, "near-field" can include measurements taken a distance from the seismic source that is less than about a wavelength of the acoustic signal from the seismic source, "intermediate-field" can include measurements taken a distance from the seismic source approximately equal to, or on the same order of magnitude as, the wavelength, and "far-field" can include measurements taken a distance from the seismic source much greater than the wavelength. Each source element 229 can generate an acoustic signal, which radiates outward in the water. In some embodiments, a source element generates an acoustic signal by releasing a high-pressure bubble of air into the water. There may be a radial displacement of the water from the center of the bubble, and a pressure disturbance may be propagated outward in the water. As the bubble expands, the pressure of the air in the bubble can drop until it falls to that of the surrounding water, but inertia can cause the bubble to over-expand so that the air pressure in the bubble is less than the hydrostatic pressure of the surrounding water. Then the over-expanded bubble can contract due to the hydrostatic pressure and the process of expansion and contraction can continue with the bubble oscillating through many cycles. As the bubble oscillates, the bubble pressure can vary, and pressure waves can radiate outward into the water. The bubble oscillation amplitude may decrease with time, and the period of oscillation may decrease from one cycle to the next.

The detailed features of a signature can be determined by subsequent motion of the bubble following its release from a source element. A near-field signature associated with a source element can be plotted with a horizontal axis representing time and a vertical axis representing pressure. A first peak may represent an initial build-up and release of a bubble from the source element into the water, after which, subsequent peaks may represent a decrease in amplitude with increasing time. The near-field signature may reveal that the pressure after reaching a peak can fall to values below the hydrostatic pressure. The bubble oscillation amplitude can decrease as time passes and the bubble period of oscillation may not be constant from one cycle to the next. That is, the bubble motion may not be simple harmonic motion. In general, a source element with a larger chamber volume may produce larger peak amplitudes and longer bubble periods. The near-field signature may be influenced by the acoustic signals created by other source elements that are actuated simultaneously. When the source elements are fired simultaneously, the hydrostatic pressure around each bubble may not be constant. Pressure waves radiating from other bubbles from many different directions can impinge on each bubble, modifying the behavior of the bubble and the associated near-field signature. The source elements can be selected with different chamber volumes and arranged in a particular manner in order to generate a resulting far-field seismic wave with a short and narrow signature in the vertical-downward direction and with a spectrum that is smooth and broad over a frequency band of interest.

FIG. 3 illustrates a narrow-azimuth geometry survey in association with estimation of direct arrival signals based on predicted direct arrival signals and measurements. A narrow-azimuth towed streamer (NATS) survey can use one marine survey vessel 318 towing steamers 320 having seismic receivers 322. In some embodiments, the marine survey vessel 318 can also tow a seismic source 326. A number of embodiments of the present disclosure can employ NATS surveys.

FIG. 4 illustrates a multi-azimuth geometry survey in association with estimation of direct arrival signals based on predicted direct arrival signals and measurements. A multi-azimuth (MAZ) geometry survey can include two or more NATS surveys, such as is as illustrated by marine survey vessels 418-1, 418-2, 418-3 and their respective seismic sources 426-1, 426-2, 426-3. The MAZ can be completed via multiple passes performed by one vessel (where marine survey vessels 418-1, 418-2, 418-3 represent one vessel in different positions over time) or by multiple vessels (where marine survey vessels 418-1, 418-2, 418-3 represent more than one marine survey vessel). The combination of data with different azimuths can help cancel diffracted multiples and preserve primaries after normal move-out correction, which can result in improved attenuation of the multiples with additional improved signal-to-noise content due to the increase in fold. A number of embodiments of the present disclosure can employ MAZ surveys.

FIG. 5 illustrates a wide-azimuth geometry survey in association with estimation of direct arrival signals based on predicted direct arrival signals and measurements. A wide-azimuth towed streamer (WATS) survey can include marine survey vessel 518-2 towing streamers 520 with seismic receivers 522 and other marine survey vessels 518-1, 518-3 towing respective seismic sources 526-1, 526-2 on each side of the marine survey vessel 518-2 towing the streamers 520. Although the marine survey vessels 518-1, 518-3 towing the seismic sources 526-1, 526-2 are illustrated in line with the marine survey vessel 518-2 towing the streamers 520, embodiments are not so limited as the marine survey vessels 518-1, 518-3 towing the seismic sources 526-1, 526-2 may be staggered with respect to the marine survey vessel 518-2 towing the streamers 520. In some embodiments, in a WATS survey, data for the same area may be recorded more than once using different offsets of the marine survey vessels 518-1, 518-3 towing the seismic sources 526-1, 526-2 versus the marine survey vessel 518-2 towing the streamers 520. In some embodiments, the marine survey vessels 518-1, 518-3 towing the seismic sources 526-1, 526-2 can be on opposite ends of the streamers 520. In a WATS survey, the cross-line aperture is extended with respect to that of a NATS survey. A number of embodiments of the present disclosure can employ WATS surveys.

Figure 6A:
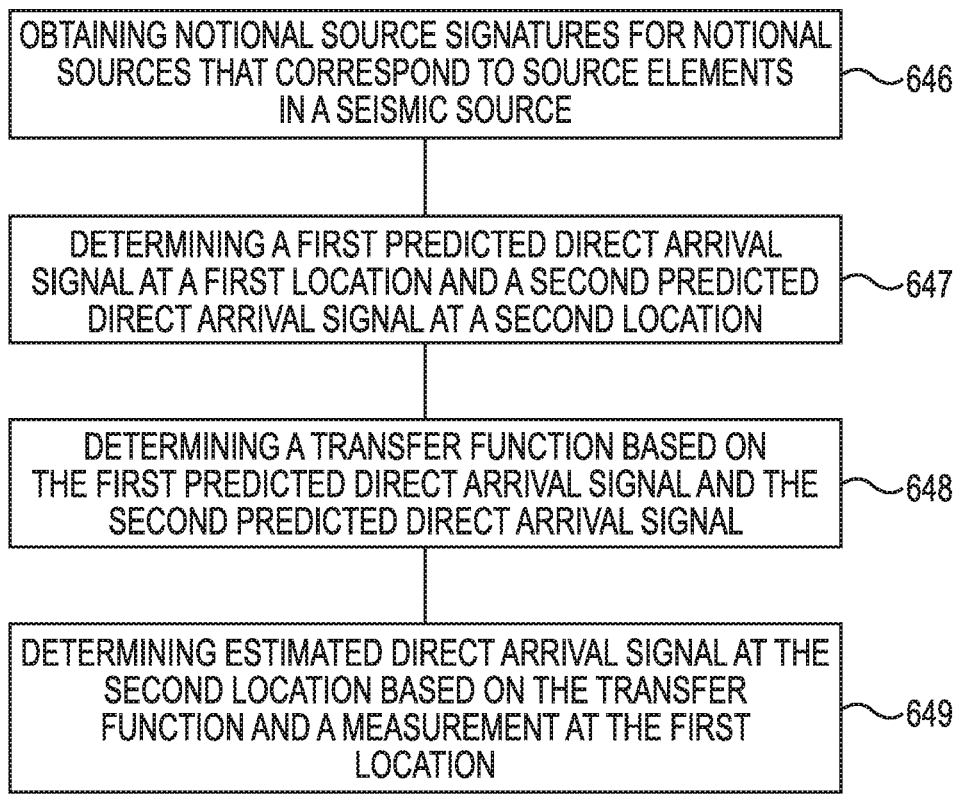
FIG. 6A illustrates a method flow diagram for estimation of direct arrival signals based on predicted direct arrival signals and measurements.

FIG. 6A illustrates a method flow diagram for estimation of direct arrival signals based on predicted direct arrival signals and measurements. At block 646, the method can include obtaining notional source signatures for notional sources that correspond to source elements in a seismic source. In some embodiments, obtaining the notional source signatures can include determining the notional source signatures based on a near-field measurement of the seismic source. In some embodiments, obtaining the notional source signatures can include determining the notional source signatures based on a modeled notional source signature. In some embodiments, obtaining the notional source signatures can include receiving notional source signatures that were previously determined.

At block 647, the method can include determining, using the notional source signatures, a first predicted direct arrival signal at a first location and a second predicted direct arrival signal at a second location. As described herein, methods (e.g., determining, calculating, predicting, estimating, etc.) can be performed by a machine such as a computing device. The first and second predicted direct arrival signals can be determined for a notional source signature of a seismic source. The first predicted direct arrival signal can be determined for a first location corresponding to a seismic receiver. For example, a seismic receiver may be intended to be at the first location. The second predicted direct arrival signal can be determined for a second location that does not correspond to a seismic receiver. For example, a seismic receiver may not be intended to be at the second location.

At block 648, the method can include determining a transfer function based on the first predicted direct arrival signal and the second predicted direct arrival signal. As described herein, the first predicted direct arrival signal can be determined for the first location and the second predicted direct arrival signal can be determined for the second location. The transfer function can be any suitable transfer function, as described in more detail below.

At block 649, the method can include determining an estimated direct arrival signal at the second location based on the transfer function and a measurement at the first location. The measurement at the first location can be made by a seismic receiver corresponding to the first location, such as a seismic receiver that is intended to be at the first location. The estimated direct arrival signal can represent what a measured direct arrival signal would be at the second location, for example, if there was a seismic receiver at the second location.

Figure 6B:
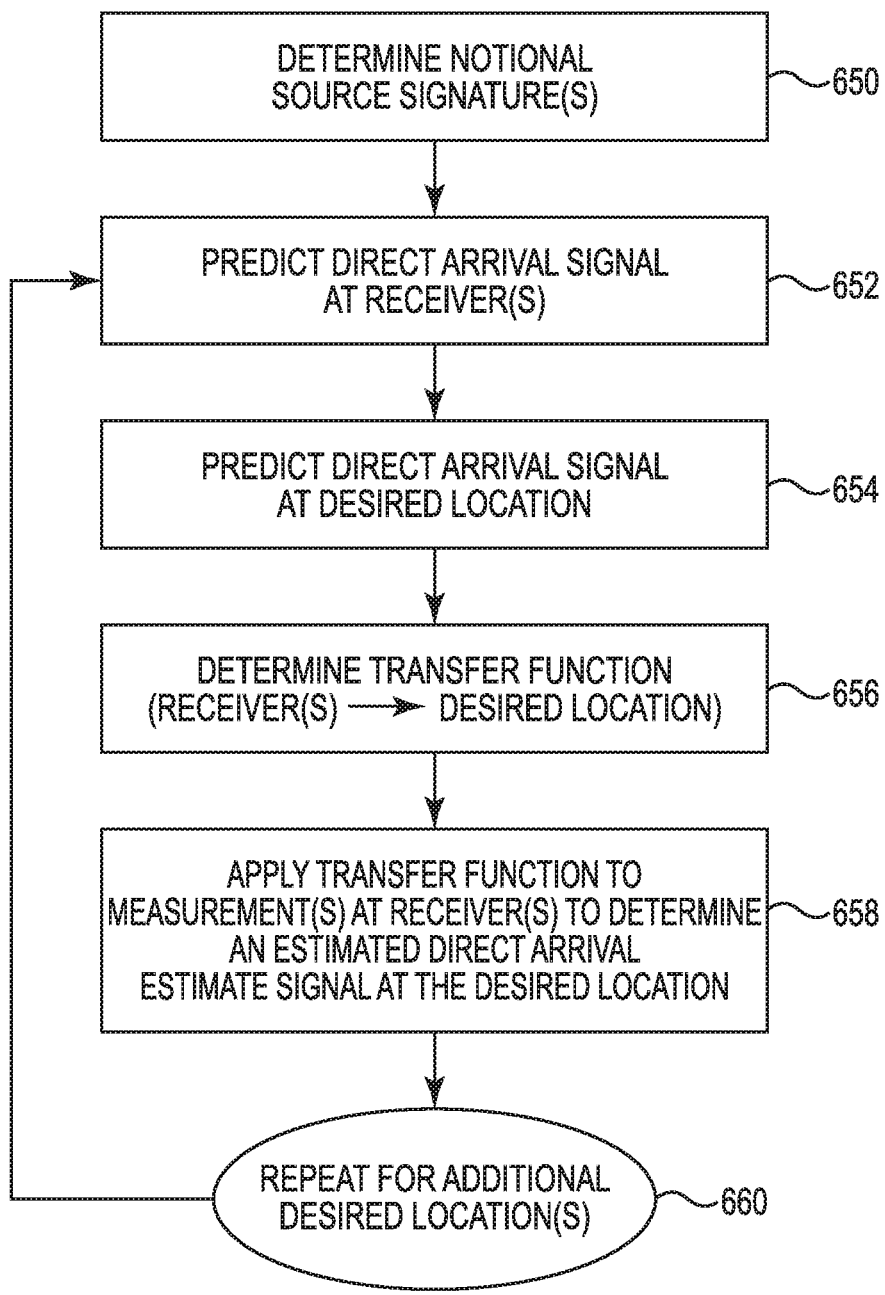
FIG. 6B illustrates a method flow diagram for estimation of direct arrival signals based on predicted direct arrival signals and measurements.

FIG. 6B illustrates a method flow diagram for estimation of direct arrival signals based on predicted direct arrival signals and measurements. At block 650, the method can include determining a notional source signature (or a set of notional source signatures for a corresponding source array). Embodiments are not limited to a particular technique for determining the notional source signature. Examples of techniques for determining the notional source signature include near-field measurement of the seismic source, modeling the near-field signature, and combinations of measuring and modeling, among others.

Some embodiments can include determining the notional source signatures representing the acoustic signal emitted from each source element in a source array based on a near-field measurement of the seismic source. For example, the following equation can be used:

$$n_n(t) = \frac{h_n(t)}{s_n} - \sum_{l=1}^{m(l \neq n)} \frac{1}{R_{ln}} n_l\left(t - \frac{R_{ln}}{c}\right) - \sum_{l=1}^{m} \frac{r}{R'_{ln}} n_l\left(t - \frac{R'_{ln}}{c}\right) \quad (1)$$

where $n_n(t)$ is the $n^{th}$ notional source signature, $h_n(t)$ is the nth near-field seismic receiver (e.g., hydrophone or geophone) measurement, $s_n$ is the sensitivity of the $n^{th}$ seismic reciever, $R_{ln}$ is the distance from the $l^{th}$ source element to the $n^{th}$ seismic reciever, $R'_{ln}$ is the distance from the source element to the sea surface and down to the $n^{th}$ seismic receiver along the ray direction, r is the reflectivity of the sea surface, c is the velocity of sound in water, and m is the number of seismic receivers and number of source elements in the source array.

In some embodiments, notional source signatures can be determined using numerical modeling techniques. For example, the assumed distances and locations of the seismic receivers and source elements of the source array can be used to determine the modeled notional source signatures using seismic analysis and data processing.

At block 652, the method can include determining, for a notional source signature of a seismic source, a first predicted direct arrival signal at a first location, where the first location corresponds to a seismic receiver, such as seismic receiver 222-1 illustrated in FIG. 2A. The measured direct arrival signal can be predicted in any seismic receiver positions where the direct arrival signal has been recorded using the notional source signatures plus assumed relative positions of the seismic source and the seismic receiver.

The determined notional source signatures or the acoustic signals emitted by each source element in the array may be propagated from the position of the seismic source to a seismic receiver position where a measurement is available, through the following equation:

$$P'_n(\omega) = \sum_{l=1}^{m} \frac{N_l(\omega) e^{-i\omega R_{ln}/c}}{R_{ln}} + r \sum_{l=1}^{m} \frac{N_l(\omega) e^{-i\omega R'_{ln}/c}}{R'_{ln}} \quad (2)$$

Where $P'_n(\omega)$ is the predicted direct arrival signal in seismic receiver position n as a function of angular frequency $\omega$, $N_l(\omega)$ is the $l^{th}$ notional source signature as a function of angular frequency (the Fourier transform of $n_l(t)$), $R_{ln}$ is the distance along the ray direction between the $l^{th}$ seismic receiver and the $n^{th}$ seismic receiver, r is the reflectivity of the sea surface, and $R'_{ln}$ is the distance from the $l^{th}$ air gun to the sea surface and down to the position of the $n^{th}$ seismic receiver along the ray direction. The distances may be calculated from the assumed positions of the source elements ($x_l^s$, $y_l^s$, $z_l^s$) and the position of the seismic receiver ($x_n^r$, $y_n^r$, $z_n^r$). If several seismic receivers are connected in seismic receiver arrays, then the calculations may be repeated for each individual seismic receiver position in the array, and summed or averaged to include the response of the receiver array.

Although not specifically shown in FIG. 6B, the difference between the predicted and measured direct arrival signal can be quantified. In some embodiments, an optimization of the assumptions may be performed to minimize the difference between the predicted and the measured direct arrival signal. For example, if the difference exceeds a predefined threshold, then the assumptions can be optimized. If $P_n(\omega)$ is the actual measured direct arrival signal in seismic receiver position n, then the assumptions in Equation 2 can be optimized to minimize the difference between the predicted direct arrival signal and the measured direct arrival signal. This optimization may, for example, be done simultaneously for many different measured seismic receiver positions and different streamers in a 3D spread. The parameters to optimize may be the x,y,z coordinates of the individual air guns and the seismic receivers (since there may be some uncertainties in the positioning of these), reflectivity of the sea surface r, and/or the propagation velocity of sound in water c.

Optimization of the assumptions can include adjusting the assumed relative positions based on the measurement by the seismic receiver before determining the first predicted direct arrival signal. Optimization of the assumptions can include adjusting the assumed reflectivity of the sea surface and/or the propagation velocity of sound in water. In various embodiments, the optimization may be repeated for many different seismic receiver positions to derive a global optimum. An assumed position of the seismic source can be adjusted based on a plurality of measurements at a plurality of seismic receivers and a respective plurality of assumed positions of the plurality of seismic receivers before determining the first predicted direct arrival signal.

At block 654, the method can include determining, for a notional source signature of a source element (or a set of notional source signatures for a corresponding source array), a second predicted direct arrival signal at a second location, where the second location does not correspond to a seismic receiver, such as location 240-1 illustrated in FIG. 2A. From the same notional source signatures, a predicted direct arrival signal can be determined in an extrapolated seismic receiver position. The predicted direct arrival signal in the extrapolated seismic receiver position, such as a position where there is no measurement, $P'_m(\omega)$ may be determined using Equation 2, but in a different seismic receiver position $(x_m^r, y_m^r, z_m^r)$ where there are no real measurements and where the direct arrival signal is to be predicted.

At block 656, the method can include determining a transfer function based on the first predicted direct arrival signal at the first location (the location corresponding to a seismic receiver) and the second predicted direct arrival signal at the second location (the location not corresponding to a seismic receiver). Suitable transfer functions may convert the first predicted direct arrival signal at block 652 to the second predicted direct arrival signal at block 654. In some embodiments, this transfer function represents an extrapolation operator(s) from the measured seismic receiver position(s) to the new seismic receiver position.

For example, a suitable transfer function between $P'_n(\omega)$ and $P'_m(\omega)$ representing the extrapolation operator of the direct arrival signal from seismic receiver position $(x_n^r, y_n^r, z_n^r)$ to seismic receiver position $(x_m^r, y_m^r, z_m^r)$ may be determined by $$E_{nm}(\omega) = \frac{P'_m(\omega)}{P'_n(\omega)} \quad (3)$$

where $E_{nm}(\omega)$ is the extrapolation operator of the direct arrival signal from seismic receiver position n to seismic receiver position m. In some instances, some stabilization may be useful to avoid instabilities in this complex division in case there are limited signals in parts of the spectrum. Alternatively, the determination of a suitable transfer function may be done using a least squares approach:

$$E_{nm}(\omega) = \frac{P'_m(\omega) P'^*_n(\omega)}{|P'_n|^2 + \varepsilon} \quad (4)$$

where the * denotes complex conjugation, and $\varepsilon$ is a stabilization parameter to avoid division by zero.

At block 658, the method may include determining an estimated direct arrival signal at the second location, for example the location not corresponding to a seismic receiver, based on the transfer function and a measurement by the seismic receiver corresponding to the first location, for example the location corresponding to a seismic receiver. The extrapolation operator(s) can be applied to the measured direct arrival signal(s) in the seismic receiver position(s) used at block 652, to estimate the direct arrival signal in the new position at block 654. If several seismic receiver positions are used as input to derive several extrapolation operators, several estimates of extrapolated direct arrival signals in the same new seismic receiver position may be made. These may be averaged to end up with one extrapolated direct arrival signal in one new seismic receiver position. Thus, the method can include determining a plurality of predicted direct arrival signals for a respective plurality of locations that correspond to a respective plurality of seismic receivers. The method can include determining a respective plurality of transfer functions based on the plurality of predicted direct arrival signals at the respective plurality of locations and the second predicted direct arrival signal at the second location. The method can include determining a respective plurality of estimated direct arrival signals at the second location based on the respective plurality of transfer functions and a respective plurality of measurements at the respective plurality of seismic receivers. The method can include averaging the respective plurality of estimated direct arrival signals as a single estimated direct arrival signal at the second location.

The measured direct arrival signal may be extrapolated from seismic receiver position $(x_n^r, y_n^r, z_n^r)$ to seismic receiver position $(x_m^r, y_m^r, z_m^r)$ by $$P_m^{ext}(\omega) = P_n(\omega) E_{nm}(\omega) \quad (5)$$

Where $P_n(\omega)$ is the measured direct arrival signal in seismic receiver position $(x_n^r, y_n^r, z_n^r)$. The direct arrival signal may be separated from the reflected data before the extrapolation is done. This may generally be considered trivial in deep water areas, but it may be a challenge in very shallow waters, where the direct arrival signal and the reflected data may interfere.

To improve the robustness of the method, the direct arrival signal in many different measured seismic receiver positions may be extrapolated to the same location $(x_m^r, y_m^r, z_m^r)$ and be averaged:

$$P_m^{ext}(\omega) = \frac{1}{n}\sum_{l=1}^{n} P_l(\omega) E_{lm}(\omega) \quad (6)$$

At block 660, the method may return to box 652 to repeat boxes 652-658 to estimate a direct arrival signal at another desired location that does not correspond to a seismic receiver. The method may be repeated for all the x,y,z seismic receiver positions where there is a desire to extrapolate the direct arrival signal. Thus, the method can include determining a third predicted direct arrival signal at the first location (e.g., location of seismic receiver 222-1 illustrated in FIG. 2A) corresponding to a seismic receiver and a fourth predicted direct arrival signal at a third location (e.g., location 240-2 illustrated in FIG. 2A) not corresponding to a seismic receiver. The method can include determining a second transfer function based on the third predicted direct arrival signal at the first location and the fourth predicted direct arrival signal at the third location. The method can include determining an estimated direct arrival signal at the third location based on the second transfer function and the measurement by the seismic receiver corresponding to the first location. The method may be beneficially achieved through the use of a machine such as a computer.

Figure 7:
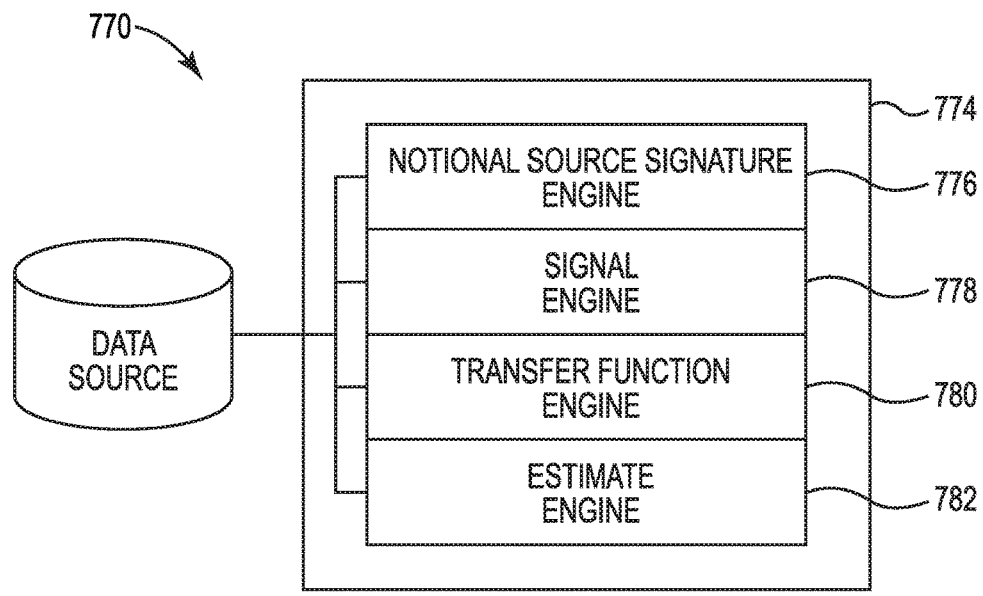
FIG. 7 illustrates a diagram of a system for estimation of direct arrival signals based on predicted direct arrival signals and measurements.

FIG. 7 illustrates a diagram of a system for estimation of direct arrival signals based on predicted direct arrival signals and measurements. The system 770 can include a data store 772, a subsystem 774, and/or a number of engines (e.g., notional source signature engine 776, signal engine 778, transfer function engine 780, and/or estimate engine 782) and can be in communication with the data store 772 via a communication link. The system 770 can include additional or fewer engines than illustrated to perform the various functions described herein. The system can represent program instructions and/or hardware of a machine (e.g., machine 884 as referenced in FIG. 8, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions, such as software, firmware, etc., can be stored in a memory resource such as a machine-readable medium, machine-readable medium, etc., as well as hard-wired program such as logic. Hard-wired program instructions can be considered as both program instructions and hardware.

The notional source signature engine 776 can include a combination of hardware and program instructions that is configured to determine a combined notional source signature for notional sources that correspond to source elements in a seismic source. The notional source signature engine 776 can time shift a plurality of notional source signatures comprising the combined notional source signature to account for variations in firing times of the source elements, for example, for embodiments where the seismic source comprises an array of source elements that fire at different times.

In some embodiments, the signal engine 778 can include a combination of hardware and program instructions that is configured to predict a first signal based on a propagation of the combined notional source signature to a first location having a seismic receiver taking into account a distance from the source elements to the seismic receiver. The signal engine 778 can predict a second signal based on a propagation of the combined notional source signature to a second location not having a seismic receiver taking into account a distance from the source elements to the second location. The signal engine 778 can predict the first signal based on the propagation of the combined notional source signature to a first location directly from the source elements and indirectly via reflection from a sea surface. The signal engine 778 can predict the second signal based on the propagation of the combined notional source signature to a second location directly from the source elements and indirectly via reflection from the sea surface. The signal engine 778 can predict the first signal further taking into account a time of the propagation of the combined notional source signature to the first location. The signal engine 778 can predict the second signal further taking into account a time of the propagation of the combined notional source signature to the second location. The signal engine 778 can predict the first signal and the second signal further taking into account a reflectivity of the sea surface.

In a number of embodiments, the transfer function engine 780 can include a combination of hardware and program instructions that is configured to determine a transfer function, as described herein, between the first location and the second location. In some embodiments, the estimate engine 782 can include a combination of hardware and program instructions that is configured to apply the transfer function to a measurement at the first location to estimate a measurement at the second location, as described herein.

Figure 8:
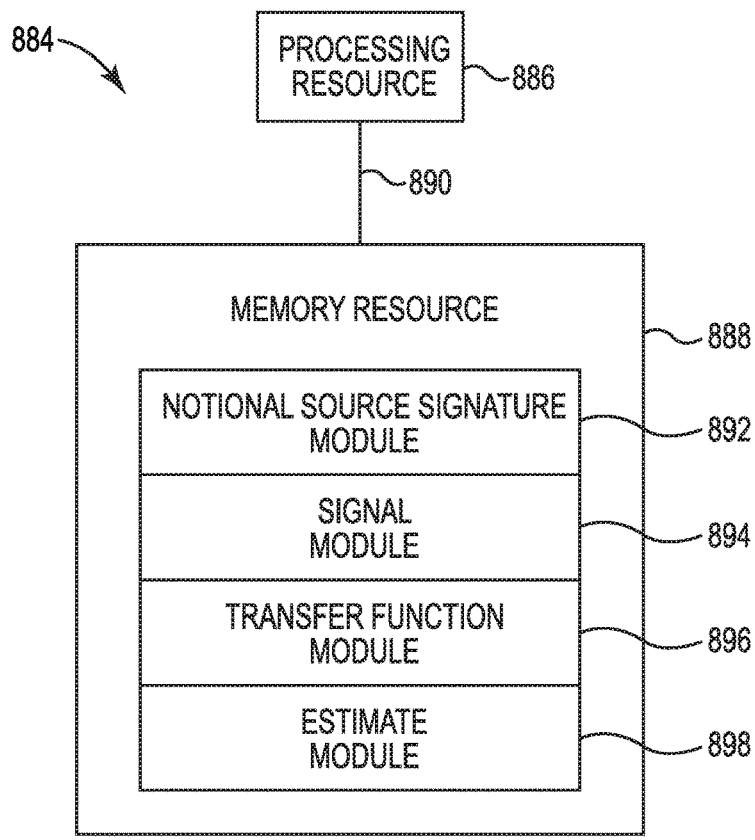
FIG. 8 illustrates a diagram of a machine for estimation of direct arrival signals based on predicted direct arrival signals and measurements.

FIG. 8 illustrates a diagram of a machine for estimation of direct arrival signals based on predicted direct arrival signals and measurements. The machine 884 can utilize software, hardware, firmware, and/or logic to perform a number of functions. The machine 884 can be a combination of hardware and program instructions configured to perform a number of functions (e.g., actions). The hardware, for example, can include a number of processing resources 886 and a number of memory resources 888, such as a machine-readable medium or other memory resources 888. The memory resources 888 can be internal and/or external to the machine 884, for example, the machine 884 can include internal memory resources and have access to external memory resources. The program instructions, such as machine-readable instructions, can include instructions stored on the machine-readable medium to implement a particular function, for example, an action such as determining an estimated direct arrival signal. The set of machine-readable instructions can be executable by one or more of the processing resources 886. The memory resources 888 can be coupled to the machine 884 in a wired and/or wireless manner. For example, the memory resources 888 can be an internal memory, a portable memory, a portable disk, and/or a memory associated with another resource, for example, enabling machine-readable instructions to be transferred and/or executed across a network such as the Internet. As used herein, a "module" can include program instructions and/or hardware, but at least includes program instructions.

Memory resources 888 can be non-transitory and can include volatile and/or non-volatile memory. Volatile memory can include memory that depends upon power to store information, such as various types of dynamic random access memory among others. Non-volatile memory can include memory that does not depend upon power to store information. Examples of non-volatile memory can include solid state media such as flash memory, electrically erasable programmable read-only memory, phase change random access memory, magnetic memory, optical memory, and/or a solid state drive, etc., as well as other types of non-transitory machine-readable media.

The processing resources 886 can be coupled to the memory resources 888 via a communication path 890. The communication path 890 can be local or remote to the machine 884. Examples of a local communication path 890 can include an electronic bus internal to a machine, where the memory resources 888 are in communication with the processing resources 886 via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path 890 can be such that the memory resources 888 are remote from the processing resources 886, such as in a network connection between the memory resources 888 and the processing resources 886. That is, the communication path 890 can be a network connection. Examples of such a network connection can include a local area network, wide area network, personal area network, and the Internet, among others.

As shown in FIG. 8, the machine-readable instructions stored in the memory resources 888 can be segmented into a number of modules 892, 894, 896, 898 that when executed by the processing resources 886 can perform a number of functions. As used herein a module includes a set of instructions included to perform a particular task or action. The number of modules 892, 894, 896, 898 can be sub-modules of other modules. For example, the notional source signature module 892 can be a sub-module of the signal module 894 and/or the notional source signature module 892 and the signal module 894 can be contained within a single module. Furthermore, the number of modules 892, 894, 896, 898 can comprise individual modules separate and distinct from one another. Examples are not limited to the specific modules 892, 894, 896, 898 illustrated in FIG. 8.

Each of the number of modules 892, 894, 896, 898 can include program instructions and/or a combination of hardware and program instructions that, when executed by a processing resource 886, can function as a corresponding engine as described with respect to FIG. 7. For example, the notional source signature module 892 can include program instructions and/or a combination of hardware and program instructions that, when executed by a processing resource 886, can function as the notional source signature engine 776, the signal module 894 can include program instructions and/or a combination of hardware and program instructions that, when executed by a processing resource 886, can function as the signal engine 778, the transfer function module 896 can include program instructions and/or a combination of hardware and program instructions that, when executed by a processing resource 886, can function as the transfer function engine 780, and/or the estimate module 898 can include program instructions and/or a combination of hardware and program instructions that, when executed by a processing resource 886, can function as the estimate engine 782.

The machine 884 can include a notional source signature module 892, which can include instructions to determine notional source signatures for notional sources that correspond to source elements in a seismic source. The notional source signature can be determined by a variety of techniques. For example, the notional source signature module 892 can include instructions to determine the notional source signature based on a near-field measurement of the seismic source. In some embodiments, the notional source signature module 892 can include instructions to determine the notional source signature based on a modeled notional source signature.

The machine 884 can include a signal module 894, which can include instructions to determine a plurality of predicted direct arrival signals from the seismic source at a respective plurality of locations corresponding to plurality of seismic receivers based on the notional source signature and assumed relative positions of the seismic source and the plurality of seismic receivers. The signal module 894 can include instructions to determine a particular predicted direct arrival signal from the seismic source at a particular location based on the notional source signature, wherein the particular location does not correspond to a seismic receiver. The signal module 894 can include instructions to adjust at least one of an assumed distance between the seismic source and one of the plurality of seismic receivers and an assumed distance between the seismic source and a sea surface. Such an adjustment can reduce a difference between one of the plurality of predicted direct arrival signals and a corresponding one of the plurality of measurements.

The machine 884 can include a transfer function module 896, which can include instructions to determine a plurality of transfer functions that convert the plurality of predicted direct arrival signals to the second predicted direct arrival signal, as described herein.

The machine 884 can include an estimate module 898, which can include instructions to apply the plurality of transfer functions to a respective plurality of measurements received at the plurality of seismic receivers to estimate a plurality of direct arrival signals at the second location. In some embodiments, the estimate module 898 can average the plurality of direct arrival signals as a single estimated direct arrival signal at the second location.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   determining, by a machine, a transfer function that converts a first predicted signal at a first location to a second predicted signal at a second location based on a notional source signature of a marine survey source; and
   applying, by the machine, the transfer function to a measurement made by a marine survey receiver at the first location at a particular time to estimate an estimated measurement at the second location, wherein the estimated measurement represents what a measured signal would be at the second location where no marine survey receiver exists at the particular time.

2. The method of claim 1, wherein the method includes determining the first predicted signal based on the notional source signature and assumed relative positions of the marine survey source and the marine survey receiver.

3. The method of claim 2, wherein the method includes adjusting the assumed relative positions based on the measurement by the marine survey receiver before determining the first predicted signal.

4. The method of claim 3, wherein the method includes adjusting an assumed position of the marine survey source based on a plurality of measurements at a plurality of marine survey receivers and a respective plurality of assumed positions of the plurality of marine survey receivers before determining the first predicted signal.

5. The method of claim 2, wherein the method includes obtaining the notional source signature by determining the notional source signature based on a near-field measurement of the marine survey source.

6. The method of claim 5, wherein obtaining the notional source signature comprises determining the notional source signature based on a modeled notional source signature.

7. The method of claim 5, wherein obtaining the notional source signature comprises receiving the notional source signature that was previously determined.

8. A system, comprising:
a processing resource; and
a memory resource configured to store instructions which, when executed by the processing resource, cause the processing resource to:
determine a transfer function that converts a first predicted signal at a first location to a second predicted signal at a second location based on a notional source signature of a marine survey source; and
apply the transfer function to a measurement made by a marine survey receiver at the first location at a particular time to estimate an estimated measurement at the second location, wherein the estimated measurement represents what a measured signal would be at the second location where no marine survey receiver exists at the particular time.

9. The system of claim 8, including instructions to:
predict the first predicted signal further taking into account a time of propagation of the notional source signature to the first location; and
predict the second predicted signal further taking into account a time of propagation of the notional source signature to the second location.

10. The system of claim 8, including instructions to predict the first predicted signal and the second predicted signal further taking into account a reflectivity of the sea surface.

11. A non-transitory machine-readable medium storing instructions executable by a processing resource to cause the machine to:
determine a plurality of transfer functions that each converts a respective one of a plurality of predicted signals at a respective plurality of locations to a particular predicted signal at a particular location based on a notional source signature of a marine survey source;
apply each of the plurality of transfer functions to a respective one of a plurality of measurements made by a plurality of marine survey receivers at the respective plurality of locations during a time period to estimate a plurality of estimated measurements at the particular location, wherein the plurality of estimated measurements represent what a plurality of measured signals would be at the particular location where no marine survey receiver exists during the time period; and
average the plurality of estimated measurements as a single estimated measurement at the particular location.

12. The medium of claim 11, including instructions to adjust at least one of:
an assumed distance between the marine survey source and one of the plurality of marine survey receivers; and
an assumed distance between the marine survey source and a sea surface; to reduce a difference between one of the plurality of predicted signals and a corresponding one of the plurality of measurements.

13. The medium of claim 11, including instructions to determine the notional source signature based on a near-field measurement of the marine survey source.

14. The medium of claim 11, including instructions to determine the notional source signature based on a modeled notional source signature.

15. The medium of claim 11, wherein the particular location is directly under the marine survey source.

16. The medium of claim 11, wherein the marine survey source comprises a source array associated with one of the group including a narrow-azimuth geometry survey, a multi-azimuth geometry survey, and a wide-azimuth geometry survey.

17. The medium of claim 11, wherein the marine survey source comprises a source array associated with one of the group including a shallow water survey and a deep water survey.

18. A method to manufacture a geophysical data product, the method comprising:
obtaining geophysical data; and
processing the geophysical data to generate processed data, wherein processing the geophysical data comprises:
determining, by a machine, a transfer function that converts a first predicted signal at a first location to a second predicted signal at a second location based on a notional source signature of a marine survey source;
applying, by the machine, the transfer function to a measurement made by a marine survey receiver at the first location at a particular time to estimate an estimated measurement at the second location, wherein the estimated measurement represents what a measured signal would be at the second location where no marine survey receiver exists at the particular time; and
recording the processed data on a non-transitory machine-readable medium thereby creating the geophysical data product.

19. The method of claim 18, wherein processing the geophysical data comprises processing the geophysical data offshore or onshore.

* * * * *